United States Patent
Chill

[15] 3,660,922
[45] May 9, 1972

[54] FISH HOOK SETTING DEVICE

[72] Inventor: Duane Charles Chill, 1015 West Washington, Sandusky, Ohio 44870

[22] Filed: Mar. 18, 1970

[21] Appl. No.: 20,642

[52] U.S. Cl. ............................................. 43/15, 43/44.98
[51] Int. Cl. ....................................................... A01k 97/00
[58] Field of Search ................... 43/15, 42.04, 42.72, 44.87, 43/44.88, 44.98

[56] References Cited

UNITED STATES PATENTS

| | | | |
|---|---|---|---|
| 1,292,869 | 1/1919 | Obermiller | 43/15 |
| 2,560,875 | 7/1951 | Knott | 43/15 |
| 2,631,399 | 3/1953 | Sowa | 43/15 |
| 2,799,109 | 7/1957 | Remington | 43/15 |
| 2,801,487 | 8/1957 | Morgan | 43/15 |
| 2,694,875 | 11/1954 | Hoffmann | 43/15 |
| 3,043,045 | 7/1962 | Martuch | 43/44.98 |

Primary Examiner—Samuel Koren
Assistant Examiner—Daniel J. Leach
Attorney—McCoy, Greene & Howell

[57] ABSTRACT

A fish hook setting device comprising a cylindrical housing containing a compression spring. The housing is open at one end and has a notched lip at its opening. A thin flexible leader passes through the opening of the housing and is connected to the spring at one end and to a fish hook at its other end. A small bead is held on the leader remote from the notched lip when the spring is relaxed. The device is cocked by drawing the leader down to seat the bead behind the notched lip and thereby maintain the device in the cocked state against the urging of the spring.

10 Claims, 4 Drawing Figures

PATENTED MAY 9 1972
3,660,922
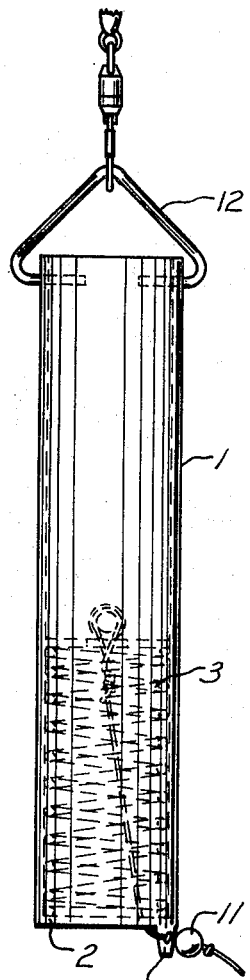
Fig 1
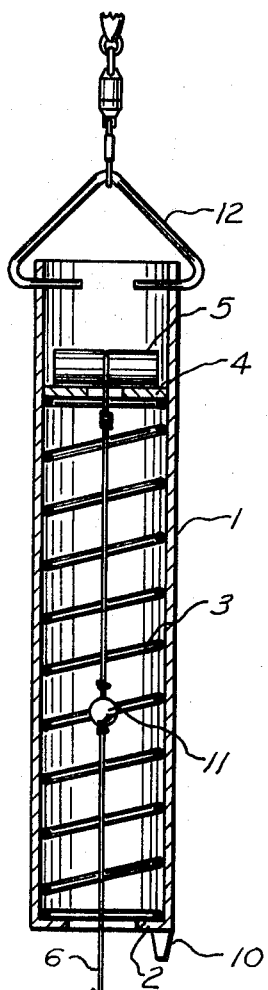
Fig 2
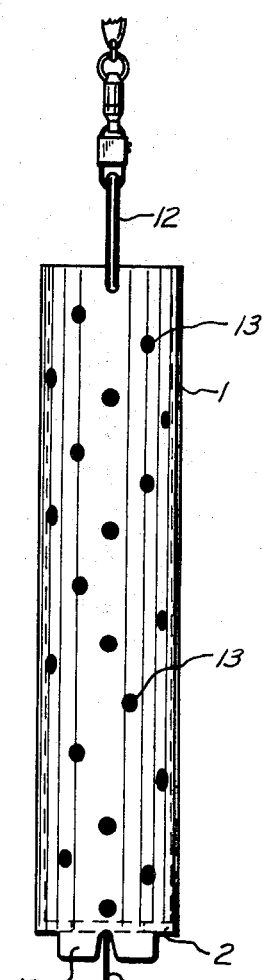
Fig 3
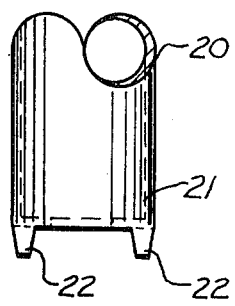
Fig 4
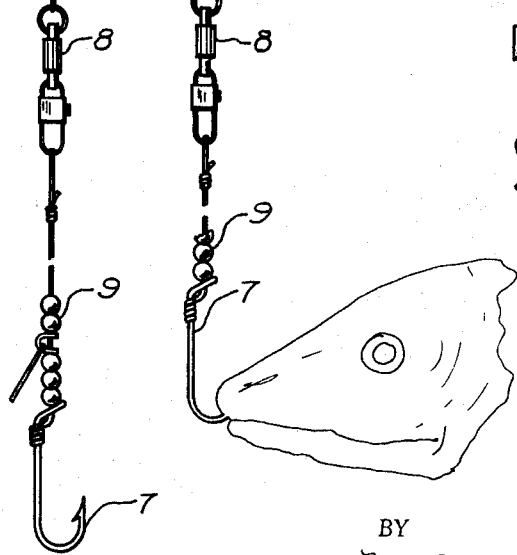
INVENTOR.
DUANE CHILL
BY
McCoy, Greene & Howell
ATTORNEYS

FISH HOOK SETTING DEVICE

BACKGROUND AND SUMMARY OF INVENTION

This invention relates to automatic fish hook setting devices.

In the sport of fishing, it is well known that the fish is often able to snatch bait from the fisherman's hook before the fisherman reacts to the fish's presence; in some cases, the fisherman's reactions are too slow to set the hook before the fish makes off with the bait. In other cases, the fisherman may be entirely unaware of the fish, as, for example, when the fisherman has set down his pole or when he is inattentive.

Briefly, my device is a spring-loaded cartridge with a trigger to which a fishing hook is attached. When a fish tugs at the baited hook, the spring is released which jerks the hook upwards, thereby setting it in the fish's mouth.

Others have designed similar devices for similar purposes, but such devices are either relatively insensitive or are so sensitive that they have tended to discharge accidentally when they touch the bottom of the pond or other objects.

My device is highly sensitive to the pull of a fish on the baited hook, but does not tend to accidentally discharge when the baited hook or other parts of the device strike the bottom of the pond or otherwise.

Accordingly, it is a primary object of the present invention to provide a fish hook setting device which is highly sensitive and discharges easily when a fish takes the hook in his mouth.

Another object of the present invention is to provide a fish hook setting device which, while highly sensitive to the fish does not tend to trigger accidentally.

Still another object of the present invention is to provide a fish hook setting device which is suitable for fishing on or near the bottom of the pond.

Other objects of the present invention will become apparent upon reading the following specification and referring to the accompanying drawings.

BRIEF DESCRIPTION OF THE DRAWINGS

In the accompanying drawings, illustrating the preferred forms of the invention, and wherein like reference numerals designate the same parts in all views:

FIG. 1 is an enlarged elevational side view of the device of the present invention, held in its cocked state.

FIG. 2 is a sectional view of the device shown in FIG. 1, but showing the device in its uncocked state in operable relation with a fish.

FIG. 3 is an elevational end view of the uncocked device shown in FIG. 2.

FIG. 4 is an enlarged elevational view of the notched lip portion of an alternate embodiment of the present invention.

DESCRIPTION OF PREFERRED EMBODIMENTS

Referring in greater detail to the drawings, the preferred form of the fish hook setting device of the present invention is shown in FIGS. 1–3 and comprises a housing 1 which is a hollow section of cylindrical tubing with a radially inwardly projecting annular rim portion 2 at its lower end. A helical compression spring 3 is disposed coaxialy within the housing 1, with one end of the spring 3 resting against the annular rim portion 2. The opposed end of the spring carries an annular washer-like member 4 which, in turn supports a cross-piece 5. A length of flexible Nylon leader filament 6 is tied about the cross-piece 5 and depends downwardly through the center of the helical spring 3 to extend out from the bottom of the housing 1. The leader filament 6 is connected to a fish hook 7. Preferably, a standard swivel hook 8 is employed so that the fish hook 7 may be detached and replaced with other hooks, as desired. Lures 9 of various types are preferably disposed above the hook 7 to attract fish to the hook.

The housing 1 is further provided with a notched lip portion 10 which projects downwardly from the lower end of the housing 1.

A small bead 11 is mounted on the leader filament 6 and is secured at a point on the filament which is remote from the notched lip portion 10 when the device is in its uncocked state, as shown in FIG. 2.

A handle 12 is attached to the upper end of the housing 1 for convenience in attaching the device to the end of a fishing line.

In the operation of the fish hook setting device of the present invention, the leader 6 is pulled downwardly against the urging of the compression spring 3 until the bead 11 passes the notched lip 10.

The leader 6 is then laid into the notch, and the bead 11 seated against the lip 10 on the opposite side thereof from the spring 3, thereby holding the spring in compression and maintaining the device in the cocked state as shown in FIG. 1.

When a fish tugs at the hook 7, the bead 11 is pulled off its seat on the notched lip 10, causing the spring 3 to discharge and jerk the hook 7 toward the housing 1. This short quick jerk on the hook 7 tends to automatically set the hook 7 in the mouth of the fish. I have essentially eliminated accidental discharges by employing the notch and bead feature shown. In prior devices, it has been common to employ relatively long rigid lever arms which while making the device sensitive to the tug of a fish, caused it to have a tendency to discharge if the lever arm were accidentally bumped. In my device, the bead 11 is small, preferably no more than about one-eighth inch in diameter, so that it does not project away from the housing 1 and thereby does not tend to be bumped off its seat. The notched lip 10 may thus be constructed to seat the bead 11 at the very edge of the lip 10, providing a hair-trigger without fear of accidental discharge.

Furthermore, the leader 6 on which the bead 11 is carried is thin and flexible, preferably being constructed of Nylon filament no more than about 0.030 inch in diameter. The primary importance of this is that the portion of the leader 6 which extends past the bead 11 is sufficiently flexible that, if it is bumped, it will not cause the device to discharge accidentally, as it would if the leader were rigid.

It will be noted that the notched lip 10 is inwardly slanted. This is an important feature of my invention inasmuch as it allows the trigger to be very sensitive to a downward tug on the hook. If the notched lip were wholly vertical, greater downward force would be required to trigger the device since for the bead to clear the edge of the lip, it would be necessary to further compress the spring. In the present invention, the inwardly slanted lip allows the bead to slide downwardly along the lip surface without further compressing the spring to any substantial degree.

The housing of my device may be brightly colored or otherwise decorated, as with dots 13 as shown in FIG. 3, to attract fish.

An alternate embodiment of the preferred form of the present invention is illustrated by FIG. 4 of the drawings, which shows the lower end portion 21 of the cylindrical housing 20 of a fish hook setting device which is substantially identical to the device illustrated in FIGS. 1–3 with the exception that two notched lip portions 22 are provided as shown. Inasmuch as the housing 20 can be constructed of plastic, it may be desirable to provide two notched lips 22 in the event that one lip wears out prematurely. Furthermore, it is apparent that more than two notched lips may be provided where there is an unusual wear problem, and the manner of adding such lips to the structure within the present invention will be readily apparent to persons of ordinary skill.

My device may also be provided with means to facilitate grasping the leader for cocking the spring. One means which may be employed for this purpose can be a short flanged section of tubing (such as a minnow lip guard) carried on the leader adjacent the hook.

From the foregoing, it is seen that the present invention provides a simple, effective and inexpensive fish hook setting device and otherwise accomplishes its intended objects. It is understood that the present invention may be embodied in several forms without departing from its spirit or essential characteristics, and that the embodiments shown and described are illustrative and not restrictive, since the scope of the invention is defined by the appended claims rather than by the description preceding them, and all changes that fall within the limits of the claims or their functional equivalents are intended to be covered by these claims.

I claim:

1. A fish hook setting device comprising a housing having an inner cavity opening at the lower end of said housing, said housing adapted to be connected to a fish line at its upper end and having an inwardly slanting notched lip portion at its lower end;

spring means having a first end and a second end, said first end held against said housing;

a thin flexible member carrying a fish hook at one end and connected at its other end to said second end of said spring means;

a small bead carried on said thin flexible member remote from said fish hook, said device having a cocked state and an un-cocked state, said un-cocked state characterized in that the bead carried on said leader is located inside said housing at a position remote from said notched lip; said cocked stage characterized in that said thin flexible member is disposed in the notch of said notched lip with said bead located on the opposite side of said notched lip from said spring means and abuts said lip to maintain said device in said cocked state against the urging of said spring tending to return said device to said un-cocked state, so that when said device is carried from its upper end at the end of a fishing line in said cocked state, a fish tugging on said hook will tend to uncock said device causing said hook to be jerked toward said housing, tending to set said fish hook in the mouth of the fish.

2. A fish hook setting device as recited in claim 1 wherein said housing is provided with a portion projecting inwardly into said housing cavity adjacent its lower end, and wherein said spring means comprises a compression spring, its first end abutting said inwardly projecting portion, said spring assuming a compressed condition when said device is in said cocked condition.

3. A fish hook setting device as recited in claim 1 wherein said bead is no more than about one-eighth inch diameter.

4. A fish hook setting device as recited in claim 2 wherein said bead is no more than about one-eighth inch diameter.

5. A fish hook setting device as recited in claim 1 wherein the portion of said thin flexible member on which said bead is carried is a length of plastic filament less than about 0.030 inch diameter.

6. A fish hook setting device as recited in claim 2 wherein the portion of said thin flexible member on which said bead is carried is a length of plastic filament less than about 0.030 inch diameter.

7. A fish hook setting device as recited in claim 3 wherein the portion of said thin flexible member on which said bead is carried is a length of plastic filament less than about 0.030 inch in diameter.

8. A fish hook setting device as recited in claim 4 wherein the portion of said thin flexible member on which said bead is carried is a length of plastic filament less than about 0.030 inch in diameter.

9. A fish hook setting device as recited in claim 1 having at least two of said notched lip portions.

10. A fish hook setting device as recited in claim 8 having at least two of said notched lip portions.

* * * * *